(12) United States Patent
Schmid

(10) Patent No.: US 6,254,133 B1
(45) Date of Patent: Jul. 3, 2001

(54) HEIGHT ADJUSTER FOR A VEHICLE SAFETY BELT

(75) Inventor: Detlev Schmid, Schwäbisch Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/618,815

(22) Filed: Jul. 18, 2000

(30) Foreign Application Priority Data

Jul. 23, 1999 (DE) .......................................... 299 12 874 U

(51) Int. Cl.[7] .......................... B60R 22/00; B60R 22/20; B60R 22/28
(52) U.S. Cl. .................................... 280/801.1; 280/801.2; 280/805
(58) Field of Search ............................... 280/805, 801.1, 280/801.2, 751; 297/470, 471, 472; 188/371, 377

(56) References Cited

U.S. PATENT DOCUMENTS

| 4,569,537 | * | 2/1986 | Else .................................... 280/801.2 |
| 5,393,098 | * | 2/1995 | Thomas et al. .................... 280/801.2 |
| 5,685,566 | * | 11/1997 | Hirase et al. ...................... 280/801.1 |
| 5,692,780 | * | 12/1997 | Yasui ................................. 280/801.2 |
| 5,779,270 | * | 7/1998 | Tanaka ................................. 280/751 |
| 5,782,491 | * | 7/1998 | Patel .................................. 280/801.2 |
| 5,826,907 | * | 10/1998 | Saito et al. ......................... 280/801.1 |
| 5,863,071 | * | 1/1999 | Li-Calso ............................ 280/801.1 |
| 5,941,567 | * | 8/1999 | Wickenheiser .................... 280/801.1 |
| 6,007,100 | * | 12/1999 | Steffens, Jr. ...................... 280/801.1 |
| 6,106,012 | * | 8/2000 | Boegge et al. ........................ 280/805 |
| B1 5,529,344 | * | 6/1996 | Yasui et al. .......................... 280/808 |

FOREIGN PATENT DOCUMENTS

19654344 7/1997 (DE) .

OTHER PUBLICATIONS

German Search Report 299 12 874.1.

* cited by examiner

*Primary Examiner*—Brian L. Johnson
*Assistant Examiner*—Joselynn Y. Sliteris
(74) *Attorney, Agent, or Firm*—Tarolli, Sundheim, Covell, Tummino & Szabo L.L.P.

(57) ABSTRACT

A height adjuster for a vehicle safety belt comprises a track and a slide piece which may be shifted within the track. The height adjuster further comprises an adjusting mechanism with a lever by which a movement of the slide piece can be unlocked or locked. Further, a deflection fitting is provided which is attached to the slide piece, and an impact protection member. The impact protection member is attached to the slide piece and extends from the slide piece in a direction away from the track. A cover part is provided which engages with the impact protection member.

13 Claims, 4 Drawing Sheets

HEIGHT ADJUSTER FOR A VEHICLE SAFETY BELT

TECHNICAL FIELD

The invention relates to a height adjuster for a vehicle safety belt.

BACKGROUND OF THE INVENTION

U.S. Pat. No. 5,529,344 shows a height adjuster for a vehicle safety belt in which a deflection fitting for a vehicle safety belt is attached to a slide piece. The slide piece may be shifted within a track by means of a stud. An impact protection member in the form of a covering hood covers the head of the stud facing the interior of the vehicle. This prevents the head of the vehicle occupant from hitting directly the head of the stud in an accident. The covering hood may be fixed only after the stud has been tightened.

BRIEF SUMMARY OF THE INVENTION

The invention is to provide a height adjuster for a vehicle safety belt which ensures low HIC (head impact criterion) values and is easy to assemble.

This is achieved in a height adjuster which comprises a track and a slide piece which may be shifted within the track. The height adjuster further comprises an adjusting mechanism with a lever by means of which a movement of the slide piece can be unlocked or locked. There is further provided a deflection fitting attached to the slide piece and an impact protection member. The impact protection member is attached to the slide piece and extends from the slide piece in a direction away from the track. A cover part is provided which engages with the impact protection member. By the impact protection member being attached above the deflection fitting, the deflection fitting may be attached independently of whether the impact protection member is fixed to the slide piece. Also, the height adjuster may be designed modularly and easily be adapted according to the modular principle to different requirements, such as fitting conditions or required HIC values, for instance.

In a further development of the invention, the impact protection member has a larger dimension in the direction away from the track than the deflection fitting. In case of an impact, the head of a vehicle occupant therefore hits the impact protection member first, and any impact of the head onto the stable deflection fitting itself may be prevented or be attenuated at least.

In a further development of the invention, the impact protection member may be slipped onto the slide piece. It is equally advantageous if the impact protection member is provided with clip connecting members engaging the slide piece. These measures further facilitate assembly of the height adjuster according to the invention.

A further developed measure provides for that the impact protection member comprises a through-opening for actuation of an adjusting mechanism of the height adjuster. Thereby, the adjusting mechanism is easily accessible on the one hand and the head of vehicle occupant may be protected against any impact onto protruding levers, buttons or latches of an adjusting mechanism on the other hand.

The impact protection member advantageously has the shape of a parallelepiped and comprises opposite side walls connected via reinforcing ribs. This results in a rib-shaped structure of the impact protection member to assist energy dissipation when the head of an occupant hits the impact protection member.

Finally, the impact protection member advantageously consists of plastic, preferably of foamed plastic. Plastics are inexpensive to produce and may be adapted to the energy-dissipation behavior required for the impact protection member in respect of their properties.

DETAILED DESCRIPTION OF THE PREFERRED EMBODIMENT

Figure 1:
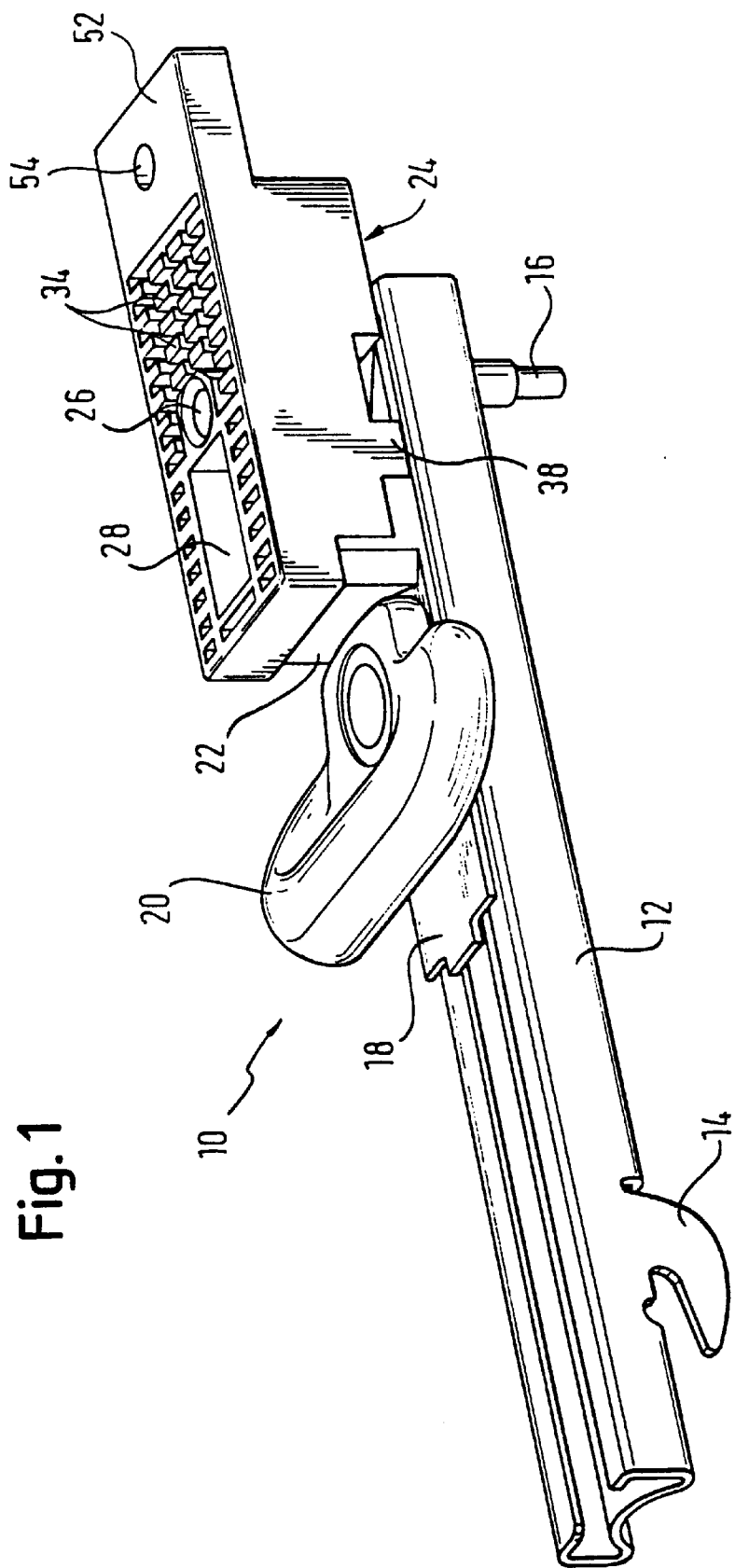
FIG. 1 is a perspective view of the height adjuster of the invention according to the preferred embodiment.

The height adjuster 10 according to the invention, which is shown in FIG. 1, comprises a track 12 for attachment to a vehicle structure like a B-column, for instance. Track 12 is provided with a hook 14 and an attachment bolt 16. A slide piece 18 is slidably disposed in the track 12. A deflection fitting 20 for a safety belt is attached to the slide piece 18. By means of an adjusting mechanism 22, the slide piece 18 may be arrested in differing positions along the track 12. In order to reduce the HIC values when a vehicle occupant's head hits the height adjuster, the deflection fitting 20 is provided with an energy-dissipating jacket and an impact protection member 24 is attached to the slide piece 18 above the deflection fitting 20 in the vertical adjustment direction. The impact protection member 24 is configured as an essentially parallelepipedal plastic piece. The impact protection member 24 comprises through-openings 26, 28 and 54. Attachment bolt 16 is accessible from the interior of the vehicle via the opening 26 so that the preassembled height adjuster 10 may be attached to the vehicle structure even when the impact protection member 24 is slipped on. The adjusting mechanism 22 of the height adjuster 10 may be reached and operated via the opening 28. Thus, the adjusting mechanism 22 is accessible from the interior of the vehicle, but, at the same time, the vehicle occupant's head is protected against an impact onto the adjusting mechanism 22 as well. At the upper end of the impact protection member 24 there is further provided a prolongation 52 with the hole 54, the function of which will be explained hereinbelow.

Figure 2:
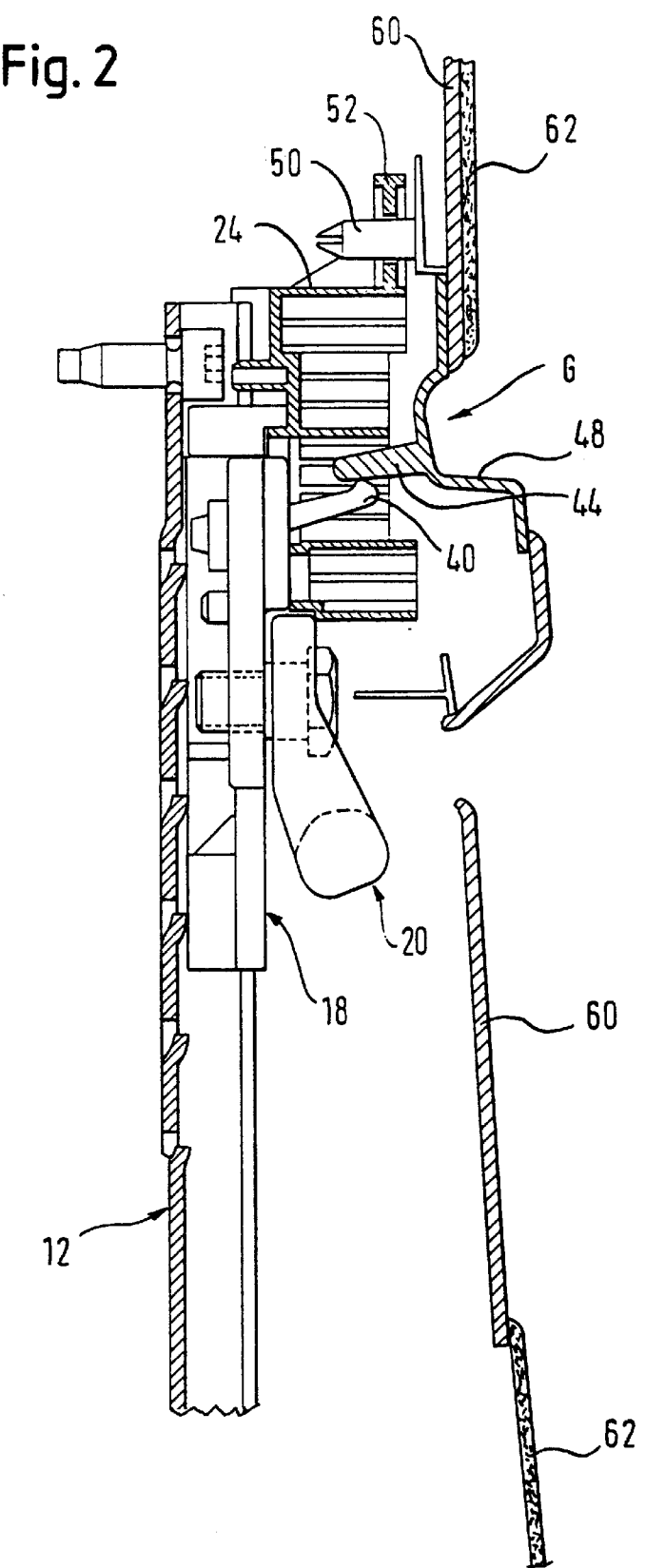
FIG. 2 is a section of the height adjuster according to the invention of FIG. 1.

From the sectional drawing of FIG. 2 there can be seen the cooperation of the individual parts as well as their accommodation behind an inner lining 62 of the vehicle column and the cover part 60, respectively. The real actuation of the height adjuster is effected by an actuating element 48 which is provided with an actuating protrusion 44. This actuating protrusion may be configured in one piece with the actuating element and extends at least partially into the opening 28 of the impact protection member 24. There, the actuating protrusion rests on the lever of the locking mechanism. To be more precise, this lever 40 which is biased through a spring (not shown) presses from below against the actuating protrusion 44 of the actuating element 48 and urges the latter against a stop (not shown) on the cover part 60. In normal operation, the actuating element lies against the stop in a rattle-free manner; if the actuating element is pressed downwards against the lever via the recessed grip G, the locking mechanism may be unlocked by overcoming the force of the spring biasing the lever and, hence, the height adjuster can be shifted relative to the track. A pin 50 of the cover part 60 extends through the hole 54 of the prolongation 52. On shifting the height adjuster with the impact protection member attached thereto, the cover part 60 is shifted via this pin relative to the vehicle-fixed inner lining 62 of the vehicle column.

Figure 3:
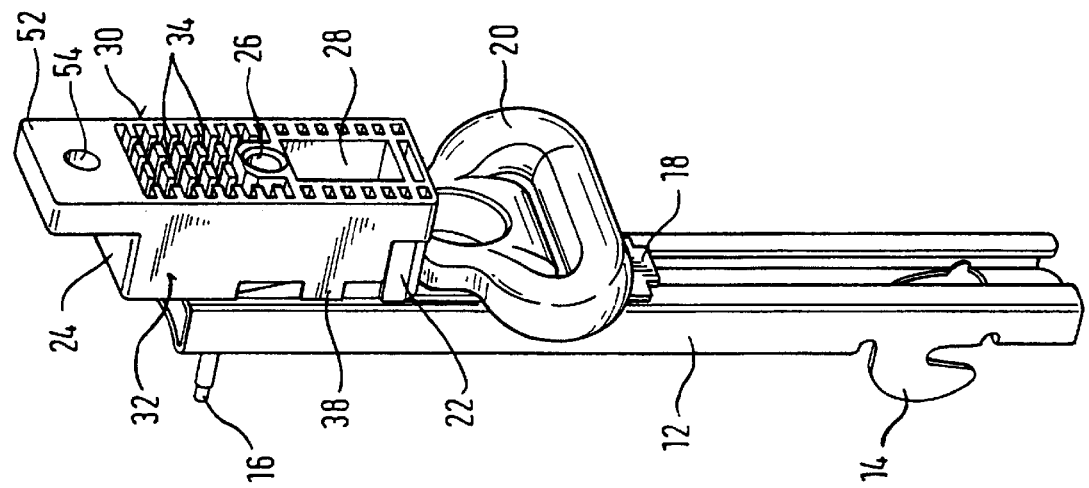
FIG. 3 is a further perspective view of the height adjuster of FIG. 1.

One may recognize from the perspective view of FIG. 3 that the parallelepipedal impact protection member 24 comprises opposing side walls 30 and 32 between which ribs 34 extend. The ribs 34 may be interrupted in the longitudinal direction of the parallelepipedal impact protection member 24 so that there result individual self-supporting rib sections. Thus, the impact protection member 24 has a rib structure which is well suited for energy dissipation when it is hit by the head of an occupant. One may also recognize well that the deflection fitting 20 is attached to the slide piece 18 independently of the impact protection member 24. Thus, one does not have to wait for the deflection fitting 20 to be finally fixed to the slide piece 18 before the impact protection member 24 may be put on. The through-openings 26 and 28 of the impact protection member 24 comprise walls which are connected with the side walls 30 and 32 of the impact protection member 24 via ribs 34. Thus, the rib structure extends over the whole impact protection member 24 so that substantially equal energy dissipation properties are ensured over the whole extent of the impact protection member 24.

Figure 4:
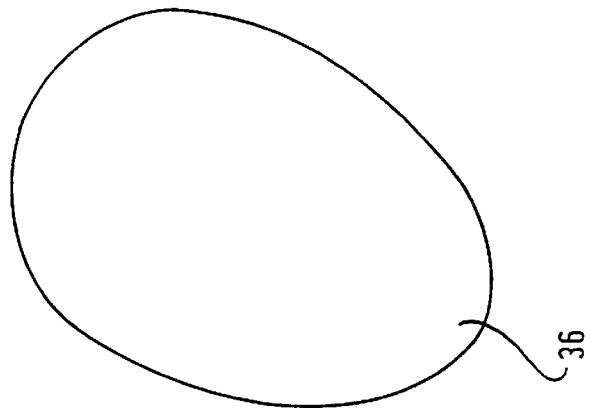
FIG. 4 is a side view of the height adjuster of FIG. 1.
Figure 4:
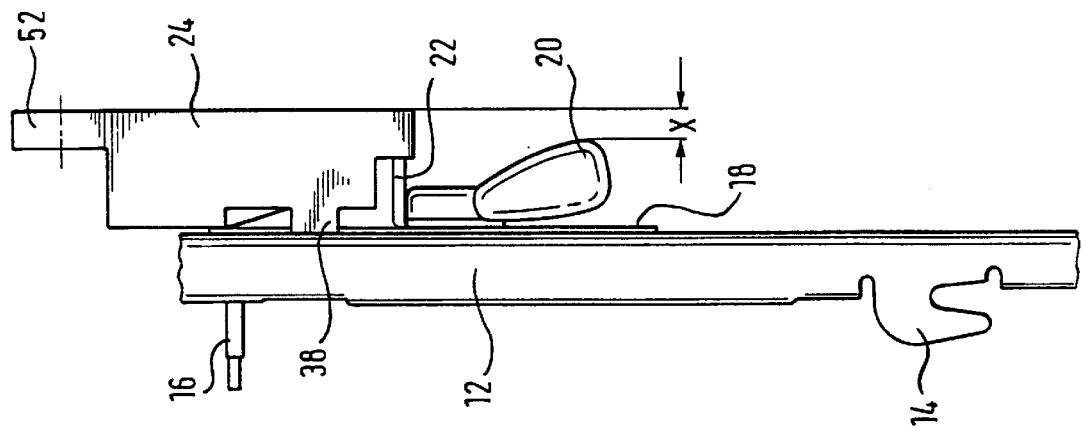

One may recognize from the side view of FIG. 4 that the impact protection member 24 has a larger dimension than the deflection fitting 20 in the direction toward the head 36 of a vehicle occupant, which is merely indicated here. The impact protection member 24 extends in the direction away from the track 12 towards the head 36 of the vehicle occupant by a distance X farther than does deflection fitting 20. Therefore, the head 36 of the vehicle occupant will first hit the impact protection member 24 so that any contact of the head 36 with the deflection fitting 20 is prevented or at least attenuated. Head 36 of the occupant is also reliably protected against the impact onto the adjusting mechanism 22 of the height adjuster 10.

The impact protection member 24 comprises clip connecting members 38 engaging the slide piece 18.

What is claimed is:

1. A height adjuster for a vehicle safety belt, comprising a track and a slide piece which may be shifted within said track, an adjusting mechanism having a lever by means of which a movement of said slide piece can be unlocked or locked, a deflection fitting attached to said slide piece and an impact protection member, said impact protection member being attached to said slide piece and extending from said slide piece in a direction away from said track, and a cover part being provided which engages with said impact protection member.

2. The height adjuster of claim 1, wherein said impact protection member has a larger dimension in a direction away from said track than said deflection fitting.

3. The height adjuster of claim 1, wherein said impact protection member may be slipped onto said slide piece.

4. The height adjuster of claim 1, wherein said impact protection member is provided with clip connecting members engaging said slide piece.

5. The height adjuster of claim 1, wherein said impact protection member has essentially the shape of a parallelepiped and comprises opposite side walls connected via reinforcing ribs.

6. The height adjuster of claim 1, wherein said impact protection member consists of plastics.

7. The height adjuster of claim 6, wherein said impact protection member consists of foamed plastics.

8. A height adjuster for a vehicle safety belt, said height adjuster comprising: a track and a slide piece which may be shifted within said track, an adjusting mechanism having a lever by means of which a movement of said slide piece can be unlocked or locked, a deflection fitting attached to said slide piece and an impact protection member, said impact protection member being attached to said slide piece and extending from said slide piece in a direction away from said track, and a cover part being provided which engages with said impact protection member, said cover part having an actuating element for said lever, said cover part and said actuating element being shiftable with each other.

9. The height adjuster of claim 8, wherein said impact protection member has a through-opening in order to allow an actuation of said adjusting mechanism.

10. The height adjuster of claim 8, wherein said impact protection member has an upper prolongation with a hole and said cover part has a pin which extends through said hole.

11. The height adjuster of claim 8, wherein said impact protection member has an opening, said actuating element having an actuating protrusion which at least partially extends into said opening of said impact protection member.

12. The height adjuster of claim 11, wherein said lever and said actuating protrusion co-operate in a region of said opening of said impact protection member.

13. A height adjuster for a vehicle safety belt, said height adjuster comprising: a track and a slide piece which may be shifted within said track, an adjusting mechanism having a lever by means of which a movement of said slide piece can be unlocked or locked, a deflection fitting attached to said slide piece and an impact protection member, said impact protection member being attached to said slide piece and extending from said slide piece in a direction away from said track, and a cover part being provided which engages with said impact protection member, said impact protection member having an opening, said opening of said impact protection member extending at least in a transverse direction.

\* \* \* \* \*